(12) United States Patent  (10) Patent No.: US 8,615,317 B2
Neumaier et al.  (45) Date of Patent:  Dec. 24, 2013

(54) PROCESS AND APPARATUS FOR GENERATING CONTROL DATA FOR CONTROLLING A TOOL ON A MACHINE TOOL COMPRISING AT LEAST 5 AXES

(75) Inventors: Josef Neumaier, Pfronten (DE); Thomas Lochbihler, Vils (AT)

(73) Assignee: Deckel Maho Pfronten GmbH, Pfronten (DE)

( * ) Notice: Subject to any disclaimer, the term of this patent is extended or adjusted under 35 U.S.C. 154(b) by 747 days.

(21) Appl. No.: 12/702,886

(22) Filed: Feb. 9, 2010

(65) Prior Publication Data

US 2010/0204814 A1  Aug. 12, 2010

(30) Foreign Application Priority Data

Feb. 9, 2009  (DE) .......................... 10 2009 008 124

(51) Int. Cl.
*G06F 19/00*  (2011.01)
*B24B 49/00*  (2012.01)
*B24B 51/00*  (2006.01)
*B24B 7/30*  (2006.01)
*B24B 1/00*  (2006.01)

(52) U.S. Cl.
USPC .................. 700/97; 700/164; 700/195; 451/5; 451/8; 451/11; 451/28; 451/57; 451/58

(58) Field of Classification Search
USPC .......... 700/97, 164, 195; 451/5, 8, 11, 28, 57, 451/58
See application file for complete search history.

(56) References Cited

U.S. PATENT DOCUMENTS 2,312,354 A  3/1943 Norberg
3,955,446 A *  5/1976 Mundy ........................... 76/115

(Continued)

FOREIGN PATENT DOCUMENTS

DE  40 16441 A1  11/1991
DE  43 26 988 A1  2/1995

(Continued)

OTHER PUBLICATIONS

Yao-Wen Hsueh et al. "Automatic Selection of Cutter Orientation for Preventing the Collision Problem on a Five-Axis Machining." The International Journal of Advanced Manufacturing Technology, Springer, Berlin, DE, vol. 32, No. 1-2, Apr. 13, 2006, pp. 66-77, XP019488033.*

(Continued)

*Primary Examiner* — Kavita Padmanabhan
*Assistant Examiner* — Jason Lin
(74) *Attorney, Agent, or Firm* — Oliff & Berridge, PLC

(57) ABSTRACT

A process and an apparatus for generating control data for controlling a tool on a machine tool comprising at least 5 axes for the production of a predetermined finished part having a base body and at least one flank section protruding from the base body, finished part geometry data of the predetermined finished part geometry of the finished part being generated by means of fundamental geometry parameters and path data being generated by means of the finished part geometry data, the path data indicating the tool path along the surface of the flank section over which the tool has to travel with what tool orientation relative to the workpiece to remove material from the workpiece, the tool orientation of the tool corresponding to an orientation of a axis of rotation of the tool and the tool rotating about the axis of rotation of the tool to remove material from the workpiece.

19 Claims, 9 Drawing Sheets

(56) References Cited

U.S. PATENT DOCUMENTS

| | | |
|---|---|---|
| 4,287,659 A | 9/1981 | Erhardt et al. |
| 4,536,110 A | 8/1985 | Farrell et al. |
| 4,590,661 A | 5/1986 | Lunazzi |
| 5,055,752 A | 10/1991 | Leistensnider et al. |
| 5,091,861 A | 2/1992 | Geller et al. |
| 5,205,806 A | 4/1993 | Ishida et al. |
| 5,297,055 A | 3/1994 | Johnstone |
| 5,309,646 A | 5/1994 | Randolph, Jr. et al. |
| 5,634,250 A | 6/1997 | Mihailovic |
| 5,923,561 A * | 7/1999 | Higasayama et al. ........ 700/186 |
| 6,170,157 B1 | 1/2001 | Munk et al. |
| 6,311,098 B1 | 10/2001 | Higasayama et al. |
| 7,153,183 B2 | 12/2006 | Kopp et al. |
| 2006/0090336 A1* | 5/2006 | Graham et al. ............. 29/889.1 |
| 2010/0111628 A1* | 5/2010 | Megens et al. .................. 409/26 |
| 2010/0176099 A1 | 7/2010 | Hilderbrand et al. |

FOREIGN PATENT DOCUMENTS

| | | |
|---|---|---|
| DE | 691 13 502 T2 | 3/1996 |
| DE | 692 21 088 T2 | 2/1998 |
| DE | 100 31 441 A1 | 3/2002 |
| DE | 10031441 A1 * | 3/2002 |
| DE | 103 22 342 A1 | 12/2004 |
| DE | 103 30 828 A1 | 2/2005 |
| DE | 20 2007 002 379 U1 | 6/2007 |
| DE | 20 2007 012 450 U1 | 12/2007 |
| DE | 10 2007 019 951 A1 | 10/2008 |
| EP | 1 114 694 A1 | 7/2001 |
| JP | A-57-89540 | 6/1982 |
| JP | A-57-89541 | 6/1982 |
| JP | A-59-129618 | 7/1984 |
| JP | A-60-44243 | 3/1985 |
| JP | A-60-146621 | 8/1985 |
| JP | A-60-146622 | 8/1985 |
| JP | A-3-245938 | 11/1991 |
| JP | A-2000-141129 | 5/2000 |
| WO | WO 2007/031337 A1 | 3/2007 |
| WO | WO 2008/133517 A1 | 11/2008 |

OTHER PUBLICATIONS

Chih-Hsing Chu et al. "Five-Axis Flank Machining of Ruled Surfaces with Developable Surface Approximation", Ninth International Conference on Computer Aided Design and Computer Graphics, 2005 IEEE, pp. 1-6.*

U.S. Appl. No. 12/702,837, filed Feb. 9, 2010 in the name of Josef Neumaier et al.

U.S. Appl. No. 12/700,983, filed Feb. 5, 2010 in the name of Josef Neumaier et al.

U.S. Appl. No. 12/702,649, filed Feb. 9, 2010 in the name of Josef Neumaier et al.

European Search Report dated Dec. 21, 2010 issued in European Patent Application No. 10 15 3085.5 (with translation).

Ren, Y., et al. "Clean-Up Tool Path Generation by Contraction Tool Method for Machining Complex Polyhedral Models," Computers in Industry, Elsevier Science Publishers, vol. 54, pp. 17-33, Sep. 13 2003.

Apr. 6, 2011 Search Report issued in European Patent Application No. 10153082.2 with partial translation.

Dec. 6, 2012 Office Action issued in U.S. Appl. No. 12/700,983.

Oct. 17, 2013 Office Action issued in U.S. Appl. No. 12/702,837.

* cited by examiner

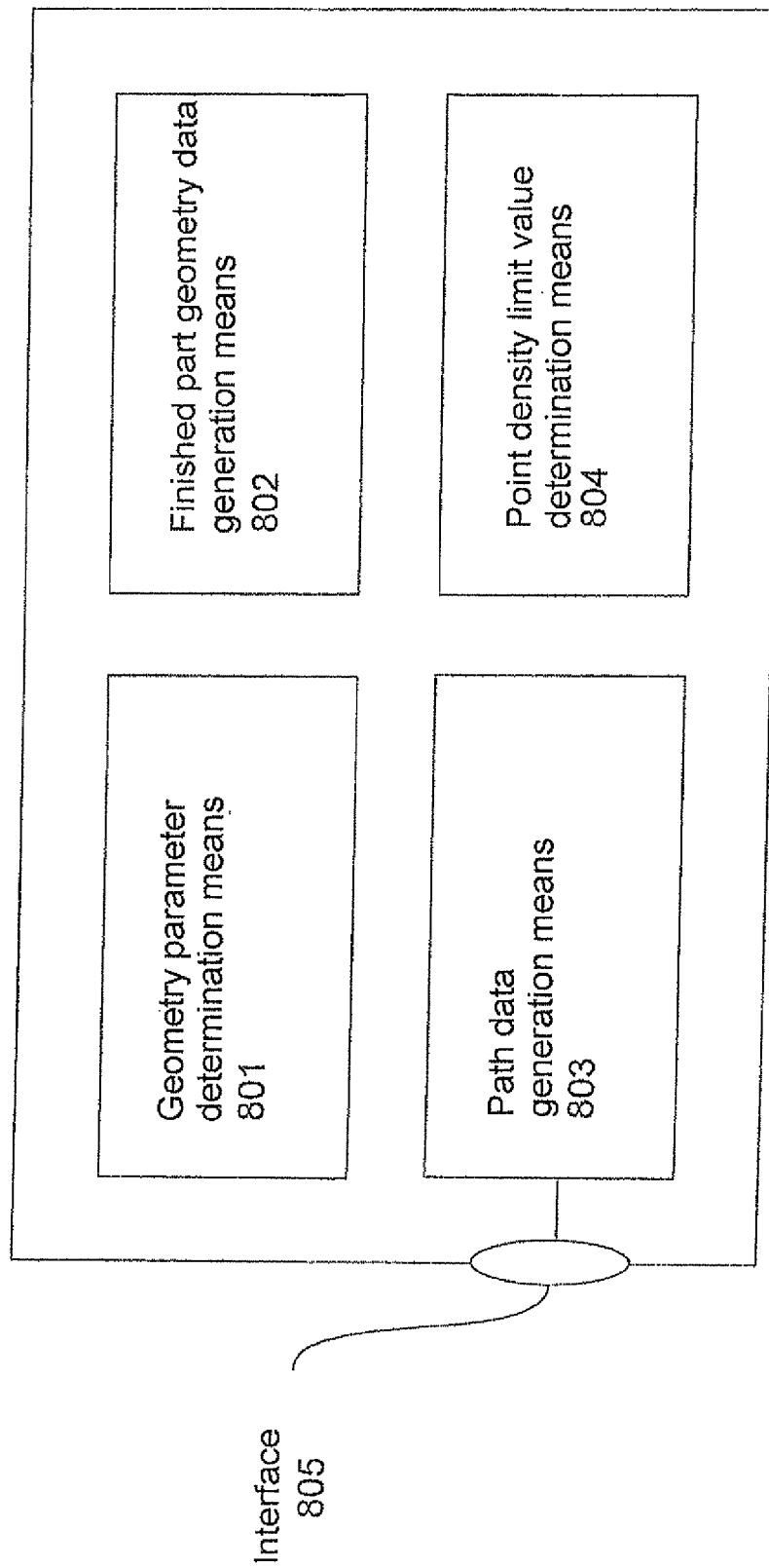

PROCESS AND APPARATUS FOR GENERATING CONTROL DATA FOR CONTROLLING A TOOL ON A MACHINE TOOL COMPRISING AT LEAST 5 AXES

The present invention relates to a process and an apparatus for generating control data for controlling a given tool on a machine tool comprising at least 5 axes to machine a clamped workpiece.

In particular, this invention relates to a process and an apparatus for generating control data for controlling a milling cutter on a CNC-controlled machine tool comprising at least 5 axes, in particular CNC-controlled milling machines, milling machines/lathes or lathes/milling machines or a CNC-controlled universal machining center comprising at least 5 axes, such as a universal milling and drilling machine tool, for machining a workpiece clamped in the machine tool from a blank into a finished part having the aspired predetermined finished part geometry, in particular the complete machining operation up to the finished part on the machine tool, the predetermined finished part comprising a base body and at least one flank section protruding from the base body. This concerns in particular the production or the shaping of finished parts, such as gear wheels, in particular spur gears having internal gearing and/or external gearing and bevel gears, impellers or blisks. In general, this relates to the production of any workpieces having any base body and at least one flank section protruding outwards or inwards therefrom.

BACKGROUND OF THE INVENTION

NC-controlled and in particular CNC-controlled machine tools are well known from the prior art for a wide variety of embodiments. CNC (computerized numerical control) here means that the machine tool numerically controls the tool guide, i.e. by means of a CNC program. The machine tool is equipped with a tool removing material from the workpiece by machining. The control of the tool, in particular a movement and/or an orientation of the tool, is effected using a control device by means of CNC control data of the CNC program. Furthermore, the CNC control data optionally controls an orientation of the workpiece, e.g. by rotating a tool table of the machine tool, on which the workpiece is clamped in the machine tool. All in all, a control by NC programs or CNC control data enables the efficient, flexible, accurate and repeatable machining of a workpiece clamped in the machine tool by means of CNC control data.

In today's prior art, CNC programs and CNC control data are produced or generated in software-supported fashion by means of CAM systems (CAM stands for "computer aided manufacturing"). A generated CNC program here comprises the control data which controls an employed tool relative to a workpiece clamped in the machine tool along a generated tool path to remove material from the workpiece when the tool travels over the path, e.g. by milling or other processes.

The numerical path calculation is here based on geometric parameters and orients itself by the predetermined aspired finished part geometry of the workpiece. Then, the material is removed path for path from the workpiece on the machine tool by means of the generated control data when the tool travels over the generated or calculated tool paths until contour of the finished part has been achieved. In addition, the control data can also comprise data which instructs a tool change, automatic tool changes being optionally carried out while the workpiece is machined. Today's machine tools often enable the conduction of an automatic program-controlled workpiece change in which after the machining of a first workpiece, the first workpiece on a workpiece clamping means of the machine tool is exchanged with a second workpiece to thus machine the second workpiece.

A particular universal and flexible use is possible with CNC-controlled machine tools which comprise at least 5 axes enabling the free movement of the tool in 5 degrees of freedom through the space to remove material from the workpiece. The 5 degree of freedom movements here comprise the 3 spatial degrees of freedom (conventionally three orthogonally controllable spatial degrees of freedom, in particular referred to as the x-axis, y-axis and z-axis) which can be controlled by at least three linear axes, and 2 angular or rotational degrees of freedom which enable any tool orientation. The two angular and rotational degrees of freedom can here be controlled by two or more rotational axes of the machine tool. Today's CNC machine tools having at least 5 axes enable the simultaneous control of the 5 degrees of freedom so as to render possible particularly complex and efficient tool paths relative to a clamped workpiece. In addition, the prior art discloses CNC machine tools having at least 6 axes along which at least 3 axes of translation and at least 3 rotational axes can simultaneously be controlled.

The above described CNC machine tools are universally used in tool construction to produce finished parts having a complex geometry efficiently and precisely by means of machining. This comprises rotationally symmetric finished parts, such as impellers or blisks making great demands on the compliance with a predetermined geometric shape. In mechanical engineering, in particular in shipbuilding, for example, in the environmental technology (e.g. in the case of wind power plants), in aviation and in machine tool manufacture, it may also be necessary to provide transmissions having the most different outputs, for which gear wheels, in particular spur gears and bevel gears, have to be produced according to different demands made on surface finish, tooth contact pattern and rolling characteristics. Here, it is often not absolutely necessary to obtain a large number of items but what matters is rather a high flexibility with respect to the broad range of types, in particular with respect to individual geometries comprising complex flank geometries, tooth flank geometries or blade geometries.

For the production of such finished parts having a base body and at least one flank section protruding from the base body, in particular gear wheels, such as spur gears or bevel gears, blisks or impellers, the prior art discloses special machine tools which are equipped with special tools to produce tooth profiles of gear wheels, such as spur gears or bevel gears, or blade or vane profiles of impellers or blisks in different embodiments.

For the production of a gearing of gear wheels the prior art discloses as special machine tools in particular hob milling machines which are suited to provide a workpiece with a gearing in a generating milling process using hob milling tools. Such hob milling machines are e.g. suited to produce spur gears having a cylindrical base body and tooth flank section protruding therefrom of the gearing or bevel gears having a conical base body and tooth flank sections protruding therefrom of the gearing.

Such special machines, in particular the above described hob milling machines, are cost-intensive as regards purchase and maintenance and the manufacture of individual flank profiles is limited by the shape of the special tools, e.g. the special shape of the cutting edge of the hob milling tools of hob milling machines, which already predefines an achievable or producible tooth and flank geometry. Moreover, the manufacture of individual flank profiles on the above described special machines is limited by the restricted degrees of freedom in a possible relative movement between workpiece and tool.

To achieve a high surface finish it is also optionally necessary to remachine or finish the workpieces after the machining operation on the above described special machines, e.g. on additional, cost-intensive special machines.

In order to solve the problems of the above mentioned special machines, in particular the hob milling machines, for the production of gear wheels, in particular spur gears or bevel gears, blisks or impellers, it is useful to produce such gear wheels, in particular spur gears or bevel gears, blisks or impellers, on a CNC-controlled is machine tool comprising at least 5 axes.

This enables the use of standard tools for the production of these finished parts, the most complex geometries, in particular the most complex flank profiles, being enabled for gear wheels, such as spur gears or bevel gears, blisks or impellers or other workpieces, by the high flexibility and the broad field of application of a machine tool controllable in at least 5 degrees of freedom.

A process for generating control data for controlling a workpiece on a machine tool comprising at least 5 axes and serving for machining a workpiece for the production of a predetermined finished part having a base body and at least one flank section protruding from the base body is described in the article "*Auf einfachem Weg zu guten Zähnen—Zahnräder mit hoher Qualität auf Standardmaschinen fräsen*" [the easy way to good teeth—mill high-quality gear wheels on standard machines] by Hans-Peter Schossig (published in the journal *Werkstatt und Betrieb*, Carl Hanser Verlag, Munich, Germany, 2007 edition, No. 4/28, pages 28-32, ISSN 0043-2792).

This above mentioned article describes a process for the production of gear wheels by means of a machine tool comprising 5 axes, in particular in the test run for the production of a bevel gear pairing having a surface finish of quality 6 according to DIN 3965. In the described process, all necessary parameters of the gearing according to DIN standard are initially inputted. This corresponds to fundamental geometry parameters of the finished part geometry of the finished part. For this purpose, it is e.g. also possible to input quantitative data on a desired tooth contact pattern with a predetermined or required tooth shape or further data on a desired convexity in individual areas or over the entire tooth flank.

These fundamental geometry parameters are typed in a computer terminal and then a mathematical description of the desired tooth geometry is generated in the computer by mathematical and/or numerical calculations. By means of a CAD/CAM system, an NC program is generated based on the calculation result according to which the 5-axis machine tool can produce the desired finished part using standard tools, in particular e.g. a known end milling cutter. A similar process is also shown in WO 2008/133517 A1, for example.

In the above described processes, the finished part, in particular the flank surfaces of the flanks, is shaped by a milling operation, e.g. using an end milling cutter or another rotationally symmetric milling tool in a milling operation. This milling operation is first simulated mathematically on a computer and the surface or flank surface of the gearing is approximated (approached) on the computer by means of a CAD system. However, such an approximation using a CAD system leads to deviations between the designed and the model flank surface or tooth flank geometry subject to the output of the approximation module or e.g. also the care exercised by the user of the CAD system.

However, high-quality known CAD/CAM systems (e.g. CATIA, UGS, EUKLID, Tebis, HyperMill) or special CAM systems (e.g. MAX-5, MAX-AB MAX-SI from Concepts NREC) provide functions for generating control programs for milling cutters having cylindrical and convex shapes.

In this connection, it is for the very production of tooth flanks of gear wheels, in particular spur gears or bevel gears, that the flank surfaces are approximated so as to be constructed for the above-mentioned special machine tools to produce gear wheels or bevel gears. Here, the surface of a tooth flank of the gear wheel to be produced or a blade of an impeller is described by so-called isoparameter curves (e.g. U-V curves) which mathematically describe an internal design of the surface or a geometric shape of the surface, The position of the isoparameter curves relative to one another and in relation to the position of the aspired gearing shape strongly depends on an arrangement of predetermined data inputs for describing the finished part geometry, in particular data inputs in the CAD system. According to the prior art, a course of the isoparameter curves along the predetermined side flank surface of an aspired gearing shape is not arranged in uniform rows perpendicularly to the tooth base of the gearing of the gear wheel. Thus, the generated isoparameter curves do not orient themselves by the root of the tooth flanks or a course of the tooth base.

When the tool paths are produced or generated for the machining of the tooth flanks or blade flanks using a CAD/CAM system known from the prior art on the basis of the above described, mathematical description generated by approximation of the side or flank surfaces, the tool or an orientation of the tool is arranged along the isoparameter curves of the surfaces to be hobbed.

Here, the problem arises that when the tool travels over the tool path, an irregular tool orientation or positioning of the tool relative to the surface to be machined can result, which can lead to disadvantageous pivoting and unsteady rotational axis movements of the machine tool and to a resulting unsteady movement of the tool along the path. In addition, this can lead to a disadvantageous inclination of the tool relative to the flank course or optionally relative to a hobbing tool guide or to a variation of the inclination of the tool relative to a moving direction along a tool path along the flank surface to be shaped. Moreover, an irregular positioning of the tool can result in a situation unfavourable as regards machining, which can cause an insufficient surface finish, geometrical errors and also a possibly increased wear of the tool.

SUMMARY OF THE INVENTION

The object of the present invention is to propose a process and an apparatus for generating control data for controlling a tool on a machine tool comprising at least 5 axes for machining a workpiece to produce a predetermined finished part having a base body and at least one flank section protruding from the base body, which are optimized with respect to the processes and apparatuses known from the prior art and avoid constant rotational axis movements of the tool and an increased wear of the tool and enable an optimum surface finish on the surface of the flank section.

According to the invention, this object is achieved by a process comprising the features of claim 1 or 13 and an apparatus comprising the features of claim 15 or 19. In addition, the present invention provides a computer program product according to claim 20 which in connection with data processing equipment is suited to carry out a process according to the invention.

Advantageous designs and preferred embodiments of the invention are described by the dependent claims.

The invention relates to a process for generating control data for controlling a tool on a machine tool comprising at least 5 axes for machining a workpiece for the production of a predetermined finished part having a base body and at least one flank section protruding from the base body, the process comprising the steps of:

determining fundamental geometry parameters of a finished part is geometry of the finished part, the finished part geometry corresponding to a geometry of the predetermined finished part, generating finished part geometry data of the predetermined finished part geometry of the finished part by means of fundamental geometry parameters, the finished part geometry data indicating at least one geometry of an at least one surface of the at least one flank section, and generating path data by means of the finished part geometry data, the path data indicating the at least one tool path along the at least one surface of the flank section over which the tool has to travel with what tool orientation relative to the workpiece to remove material from the workpiece, the tool orientation of the tool corresponding to an orientation of a axis of rotation of the tool and the tool rotating about the axis of rotation of the tool to remove material from the workpiece.

The process according to the invention is characterized in that the finished part geometry data for indicating the geometry of the at least one surface of the flank section comprises position data of a group of points on the at least one surface of the flank section, the position data indicating a position of the points of the group of points, each point of the group of points being attributed to a column of points and a line of points, all points of a column of points lying in a common plane and the common plane of the points of a column of points being substantially perpendicular to a tangential plane of the lateral surface of the base body, preferably to the tangent plane in a common point of the lateral surface and the common plane, the path data being generated such that the at least one tool path extends substantially parallel to a curve extending through the points of a first line of points, and the path data being furthermore generated such that at each of the points of the first line of points the axis of rotation of the tool orients itself substantially by the common plane of the column of the respective point of the first line or optionally lies preferably in the common plane.

At each of the points of the first line of points, the axis of rotation of the tool preferably substantially orients itself so as to lie in the common plane of the column of the respective point of the first line.

The common point preferably lies on a lead cam, the lead cam extending on the lateral surface of the base body. In the case of workpieces including a gearing, the lead cam extends in particular preferably in the tooth base between two teeth.

Also, the common plane is preferably substantially perpendicular to the lead cam.

The process is to be preferably used for the production of a finished part having a rotationally symmetric base body, e.g. gear wheels, such as spur gears or bevel gears, blisks or impellers or another workpiece having any base body and at least one flank section protruding inwards or outwards therefrom.

According to the invention, a surface to be machined or shaped of the flank section or the predetermined geometry thereof is described, as outlined above, by generated finished part geometry data which describes the surface or said surface of the flank section by position data of points lying on the surface. The finished part geometry data comprises according to the invention position data of all points of the group of points for describing the geometry of the at least one surface of the flank section, the position data comprising, or being at least transformable into, at least one position in the three-dimensional space with 3 coordinate values for the 3 translational degrees of freedom of the at least 5-axis machine tool.

According to the invention, the group of points is divided into columns of points and lines of points, each point of the group of points on the at least one surface of the flank section being attributed to a column of points and/or a line of points.

Furthermore, the path data is generated according to the invention such that the described tool path extends substantially parallel to a curve extending through the points of one of the lines of points of the group of points. This enables the calculation of a tool path course in a simple way by calculating the tool path by means of a curve extending through all points of a line, the points being accurately given by the position data.

In addition, the geometry of the at least one surface of the flank section is described by a group of points where each column of points comprises points all of which lie in a common plane which is substantially perpendicular to the base body. This means that the common plane of the points of a column of points is substantially perpendicular to a lateral surface of the base body. If the base body is given by a curved surface or curved outer or lateral surface, the common plane of the points of a column of points is thus substantially perpendicular to an imaginary tangent plane relative to the curved lateral surface of the base body. The base body here describes a geometry of an optionally rotationally symmetric body, e.g. a cone or cylinder or other rotationally symmetric geometric shapes. It should here be noted that the base body has a geometric shape which corresponds to the geometry of the finished part when the (assumed away) flank sections are omitted. In the case of a spur gear, the base body would thus correspond to a cylindrical shape or a hollow cylindrical shape (optionally in the case of a spur gear having an internal gearing). In the case of a bevel gear, the base body would correspond to a conical shape or a rotationally symmetric conical part shape.

According to the invention, the path data is furthermore generated such that the axis of rotation of the tool is oriented by the above mentioned common plane of the points of a column of points. In particular, the axis of rotation of the tool is oriented by each of the points of a line of points substantially in the common plane of the column of this respective point of the line.

This offers the advantage that the path calculation of a tool path for removing material from the workpiece for shaping at least one surface of the at least one flank section protruding from the base body can orient itself in a simple and mathematically accurate way by a group of points on the at least one surface of the flank section. Thus, when travelling over a generated path, the tool orientation does not orient itself by possibly tilted or inclined isoparameter curves but by a plane which is always perpendicular to the base body or perpendicular to the outer surface of the base body or at least perpendicular to a tangent plane of the base body.

As a result, unnecessary inclinations or variations of inclinations of the tool are effectively prevented so as to avoid unsteady rotational axis movements on the machine tool.

In addition, this enables the reduction of a machining area or application area on the tool by avoiding inclinations of the tool, thus reducing the wear of the tool. Further advantages are an improved and more accurate shaping of the tooth contact pattern of the surface or the at least one surface of the at least one flank section. A more accurate shaping of the tooth contact pattern also enables e.g. a production of a gear wheel or gear wheel pair having optimized rolling characteristics so as to also advantageously reduce the development of noise during the rolling motion, for example.

For example, one or more parameters of the group of parameters to be considered not limiting are suited as basic geometry parameters: shape of the base body, radius and circumference of the base body, height of the base body, shape of the protruding flank section, number of the protruding flank sections, height of the protruding flank section(s) or longitudinal extension of the protruding flank section(s), optionally with respect to a radial extension of the base body.

The predetermined finished part which is produced or machined in the process is preferably a gear wheel, in particular a bevel gear or spur gear, pinion, blisk or an impeller or another workpiece having any base body and at least one flank section protruding inwards or outwards therefrom, the at least one flank section being either a tooth flank of the gear wheel, a tooth flank of the pinion or a blade flank of the impeller or blisk.

This offers the advantage that the process can be used in particular for the production of gear wheels, bevel gears, spur gears, pinions, blisks or impellers, the process being also suited to advantageously produce all popular, complex geometries which optionally cannot be produced in conventional processes, In particular in the case of gear wheels, spur gears, bevel gears and pinions, this comprises all known gearing shapes and gearing extensions, e.g. the possibilities of an involute gearing, cycloid gearing or conchoid gearing or other gearing types having tooth flank surfaces which correspond to a free-form surface having a convex or concave curvature on one side or on all sides, for example. In the longitudinal direction of the gearing, the process enables all popular types of gearing, in particular straight gearing, curved gearing, herringbone gearing, helical gearing, spiral gearing or involute gearing or other possible types of gearing.

The machine tool is preferably a milling machine, milling machine/lathe or lathe/milling machine, the rotationally symmetric tool being an end milling cutter, cherry, torus cutter, drum cutter or another rotationally symmetric tool.

This offers the advantage that the process can be used on a milling machine having popular rotationally symmetric standard tools, such as end milling cutters, cherries, torus cutters, drum cutters or other popular rotationally symmetric tools.

The at least one surface of the at least one flank section is preferably a surface curved in a convex and/or concave fashion on at least one side or any curved free-form surface.

This enables the shaping of surfaces curved convexly or concavely at least on one side and in particular free-form surfaces having a curvature independently convex and/or concave on all sides or even any curvature shapes in the process according to the invention.

For the indication of the geometry of the at least one surface of the at least one flank section, the finished part geometry data also preferably comprises normal data with respect to at least one first point of the group of points, the normal data indicating at least one direction or at least one orientation of a normal vector of the at least one surface of the at least one flank section at the first point, the path data being preferably generated such that at the first point the axis of rotation of the tool is substantially perpendicular to the normal vector at the first point.

This offers the advantage that the path calculation by means of the finished part geometry data can be calculated in a particularly simple and accurate way by means of the position data of points of a group of points on the at least one surface of the flank section and normal data. An orientation or an advantageous orientation of the tool can accurately be arranged at a point of the group of points in a direction of the normal vector at this point so as to accomplish an accurately perpendicular positioning of the tool at the predetermined surface or the surface geometry. This enables an accurate path calculation in a particularly simple way, the at least 3 translational degrees of freedom on the machine tool orienting themselves by the position data of the points of the group of points and the 2 degrees of freedom of the tool orientation or the positioning of the axis of rotation of the tool being described by normal data at the points and being suited to orient themselves by the normal data of a normal vector at one of the points and the common plane of the points of a column of points.

At the first point, the normal vector of the at least one surface of the at least one flank section is preferably oriented such that it lies in the common plane of the points of the column to which the first point is attributed.

This means that the group of points advantageously describes the at least one surface of the flank section such that a column of points is just arranged such that at least one normal vector at one of the points of the column lies in the common plane of the column of points which in turn is perpendicular to the rotationally symmetric base body. Thus, an orientation of the tool is advantageously arranged in a simple and mathematically accurate way in a plane perpendicular to the rotationally symmetric base body.

For the indication of the geometry of the at least one surface of the at least one flank section, the finished part geometry data preferably comprises further normal data with respect to each of the points of a first column from the group of points, the first point being preferably attributed to the first column so that the normal data further indicates a direction or orientation of the respective normal vector of the at least one surface of the at least one flank section at each point of the first column, the normal vectors preferably at the points of the first column lying in each case in the common plane of the points of the first column.

This makes it possible that the finished part geometry data indicates the geometry of the at least one surface in a way as mathematically accurate as possible by the indication of position data of a group of points and the accompanying normal data with respect to the normal vectors of the surface at each of the points so as to be able to indicate in a mathematically accurate way position and orientation of the surface at each point and carry out a calculation of the path in a way as accurate as possible at the position data and the normal data of the points.

The path data preferably gives a plurality of tool paths along the at least one surface of the at least one flank section, the same number of points being preferably attributed to each of the columns of the group of points and each of the plurality of tool paths preferably extending substantially parallel to one of the lines of points.

This offers the advantage that each column of the group of points has the same number of points and thus each point can be attributed to one and precisely one line, the lines having no overlaps and it being possible to advantageously generate tool paths in each case along one of the lines of points in a simple and mathematically accurate way. By travelling over the plurality of tool paths, the process enables the formation of a surface of any shape having a convex or concave curvature bent on one side or on all sides using a standard tool along a plurality of tool paths. Furthermore, the plurality of tool paths can be generated or calculated in a simple and mathematically accurate way since each of the tool paths is substantially parallel to one of the lines of points, the lines of points having no overlaps.

The process also preferably comprises a process step of determining one or more point density limit values for the group of points on the at least one surface of the at least one flank section, in the step of determining finished part geometry data, the finished part geometry data being preferably generated such that the minimum and/or average distance between adjacent points of a line of the group of points and/or adjacent points of a column of the group of points in each case does not fall below at least one of the determined one or more point density limit values and/or the maximum and/or average distance between adjacent points of a line of the group of points and/or adjacent points of a column of the group of points in each case does not exceed at least one of the determined one or more point density limit values.

This offers the advantage that parameters can be inputted by means of which a density of the group of points can be determined by indicating the point density limit values which give limit values for distances between two adjacent points in a column and/or a line of points. This comprises e.g. one or more of the parameters of the following group: a first point density limit value as a maximum value of a distance between two adjacent points of a line, a second point density limit value as a minimum value for the distance between two adjacent points of a line, a third point density limit value for the maximum average value of the distance between two adjacent points of a line, a fourth point density limit value as minimum value for the average of the distance between two adjacent points of a line, and correspondingly fifth to eighth point density limit values as a maximum value, minimum value, maximum average value and minimum average value of the distance between two adjacent points of a column. This enables the adjustment of a point density as individual and advantageous as possible when the finished part geometry data is generated in accordance with a desired surface finish and/or an accuracy in the calculation of path data of one or more tool paths.

The tool is preferably a tool comprising a corner radius, preferably an end milling cutter comprising a corner radius, the path data being preferably generated such that a rounded transitional area between the at least one flank section and the base body of the tool is formed during the travel over the at least one tool path on the basis of the path data in accordance with the corner radius, the path data being in particular generated such that a tangential section is formed between the rounded transition area and a gearing-active flank area of the surface of the tooth flank section in addition to the rounded transition area during the travel over the tool path by means of the path data.

This offers the advantage that when a path is machined at the base of the flank section in the transitional area between the flank section and the base body, a surface of the flank section and a round transitional area corresponding to the corner radius of the end milling cutter can be formed between the flank section and the base body. Thus, a process is advantageously proposed in which by means of a standard tool, e.g. an end milling cutter comprising a corner radius, both a surface of the at least one flank section can be formed without tool change and at the same time the transitional area between the base body and the flank section can additionally be shaped in rounded fashion during the travel over the path.

When a finished part having several flank sections is produced, this also enables a minimum distance between two flank sections, a distance between the flank sections in accordance with a diameter of a standard tool. In this case, producible and machinable finished parts are limited with respect to the feasible size ratios only by the dimensioning of standard tools and otherwise have a particularly advantageous flexibility as regards the formable geometry shapes.

The term "gearing-active tooth flank section" here means the section of the surface of a flank section which has a curvature of the respective gearing shape and substantially contacts a corresponding mating flank in the case of a gearing and mating gearing or flank and mating flank rolling off each other, plus optionally a further safety area in which the gearing shape curvature is continued a short distance further so as to form a safety area. The also machined tangent section preferably changes on the bottom side directly and in substantially tangential fashion into the rounded transition area and on the top side directly and in substantially tangential fashion into the gearing-active tooth flank section. Here, an end milling cutter is preferably positioned at the lowest point of the gearing-active tooth flank section in substantially tangential fashion at the gearing-active tooth flank section to simultaneously shape or machine the tangent section as well as the rounded area during the travel over the calculated, lowest line or path, oriented by the lead cam. The height of the tangent section, i.e. the distance between the round transition area and the gearing-active tooth flank section can here be selected or adjusted freely as a presetting for the path calculation.

The tangent section can advantageously be shaped in a rapid and efficient fashion together with the round area when the end milling cutter only travels over one tool path. Furthermore, such a tooth root profile, which only has portions which merge into each other substantially in a tangential fashion, is surprisingly advantageous in that it offers a higher rigidity and stability of the tooths.

Furthermore, the tool preferably has a longitudinal extension along the axis of rotation of the tool, the path data being preferably generated such that when the tool travels over a first tool path of a plurality of tool paths, oriented by a first line of points, compared to its travel over a second tool path of the plurality of tool paths, oriented by a second line of points, the tool is displaced and/or rotated relatively to the respective line of points substantially in the direction of the axis of rotation of the tool such that when material is removed from the workpiece along the second tool path, a milling area, a cutting curve or a cutting line on the circumferential surface of the tool is displaced as compared to the removal of material from the workpiece along the first tool path substantially in the direction of the axis of rotation of the tool.

For this purpose, a substantially cylindrical tool is preferably displaced substantially parallel to the axis of rotation. For this purpose, a substantially conical tool is preferably displaced substantially in parallel to a tangent plane of the workpiece surface to be machined. For this purpose, the axis of rotation of the tool is also optionally rotated.

This offers the advantage that a tool wear of the tool can further be reduced by displacing in each case one positioning of the tool relative to the orientation in accordance with the predetermined axis of rotation in the direction of the axis of rotation during the travel over different tool paths of a plurality of tool paths so as to shift an application area or milling area of the tool on a circumferential side of the tool or a cutting line of the tool during the travel of a first tool path as compared to the travel over a second tool path and use in each case another or displaced application area of the tool.

Thus, a wear of the tool can be reduced by varying the operating area of the tool on the circumferential side of the rotating tool since an application area for each tool path and the resulting cutting wear along the peripheral surface of the tool is distributed or is distributed over further areas along the blade of the tool.

This offers the advantage of achieving a substantially longer tool lifetime which results in reduced tool costs and reduced downtimes, e.g. times of a necessary tool change, as well as a better surface finish caused by the reduced wear and also lower geometry errors on the surface of the workpiece. In addition, the reduction in the requirement of a tool change serves for avoiding possible errors resulting from a tool change on account of human error during the tool change, e.g. by giving in exchange a wrong replacement tool or an input error when the tool parameter of the tool newly given in exchange is defined.

The above mentioned displacement of the application area of the tool along the axis of rotation of the tool can also be used independently of the above described features to solve the problem of the present invention, namely—compared to the prior art—to provide a process which enables a better surface finish, lesser geometry errors and a reduced tool wear.

Thus, a process is alternatively proposed according to the invention for the generation of control data for controlling a tool on a machine tool comprising at least 5 axes for machining a workpiece for the production of a predetermined finished part from the workpiece by hobbing, the process comprising the steps of:
  generating finished part geometry data of the predetermined finished part geometry of the finished part, the finished part geometry data providing a geometry of the finished part, and
  generating path data by means of the finished part geometry data, the path data providing the at least two tool paths over which the tool has to travel with what tool orientation relative to the workpiece to remove material from the workpiece, the tool orientation of the tool corresponding to an orientation of a axis of rotation of the tool and the tool rotating about the axis of rotation of the tool to remove material from the workpiece and having a longitudinal extension along the axis of rotation of the tool.

The process according to the invention is here characterized in that the path data is furthermore generated such that compared to the travelling over a second tool path of the two tool paths, when the tool travels over a first tool path of the two tool paths it is subjected to relative displacement and/or rotation substantially in the direction of is the axis of rotation of the tool such that when material is removed from the workpiece along the second tool path, a milling area, a cutting curve or a cutting line on the peripheral surface of the tool is displaced substantially in the direction of the axis of rotation of the tool compared to the removal of material from the workpiece along the first tool path.

This offers the advantage that the above mentioned problems of the prior art can be solved when travelling over several tool paths in one machining process, in particular in a tool feed substantially perpendicular to the axis of rotation of the tool or at least inclined with respect to the axis of rotation of the tool. The process enables a reduction in the tool wear, a resulting improvement of the achievable surface finish and a resulting possibility of providing an optimum tooth contact pattern. This process can optionally be combined with preferred embodiments of the alternative process, i.e. the features of the subclaims or the above mentioned features.

The machine tool is here preferably a milling machine, lathe/milling machine or milling machine/lathe and the rotationally symmetric tool is preferably milling cutter or another rotationally symmetric tool, in particular with cylindrical or conical rotationally symmetric geometry. These can be e.g. rotationally symmetric standard tools, such as end milling cutters, drum cutters, torus cutters, cherries or other rotationally symmetric standard milling cutters.

Furthermore, the present invention provides apparatuses suited to carry out one of the above mentioned processes. This is in particular an apparatus for generating control data for controlling a tool on a machine tool comprising at least 5 axes for machining a workpiece for the production of a predetermined finished part having a base body and at least one flank section protruding from the base body, comprising:
  a geometry parameter detection means for determining or detecting fundamental geometry parameters of a finished part geometry of the finished part, the finished part geometry corresponding to a geometry of the predetermined finished part,
  a finished part geometry data generating means for determining or generating finished part geometry data of the predetermined finished part geometry of the finished part by means of the fundamental geometry parameters, the finished part geometry data providing at least one geometry of an at least one surface of the at least one flank section, and
  a path data generating means for generating path data by means of the finished part geometry data, the path data providing the at least one tool path along the at least one surface of the flank section over which the tool is to travel with what tool orientation relative to the workpiece to remove material from the workpiece, the tool being rotated about a axis of rotation of the tool to remove material from the workpiece.

According to the invention, the apparatus for generating control data is characterized in that the finished part geometry data for indicating the geometry of the at least one surface of the flank section comprises position data of a group of points on the at least one surface of the flank section, the position data indicating a position of the points of the group of points,
  each point of the group of points being attributed to a column of points and a line of points and all points of a column of points lying in a common plane, the common plane of the points of a column of points being substantially perpendicular to a tangent plane of the lateral surface of the base body,
  the path data being generated such that the at least one tool path extends substantially parallel to a curve extending through the points of a first line of points, and
  the path data being furthermore generated such that at each of the points of the first line of points the axis of rotation of the tool orients itself substantially by the common plane of the column of the particular point of the first line.

Alternatively, an apparatus for generating control data is provided according to the invention for controlling a tool on a machine tool comprising at least 5 axes for machining a workpiece for the production of a predetermined finished part from the workpiece, comprising:
  a finished part geometry data generating means for determining finished part geometry data of the predetermined finished part geometry of the finished part, the finished part geometry data providing a geometry of the finished part,
  a path data generating means for generating path data by means of the finished part geometry data, the path data indicating the least two tool paths along the at least one surface of the flank section over which the tool is to travel with what tool orientation relative to the workpiece to remove material from the workpiece, the tool rotating about a axis of rotation of the tool to remove material from the workpiece and having a longitudinal extension along the axis of rotation of the tool.

The apparatus for generating control data is characterized in that the path data is furthermore generated such that compared to the travelling over a second tool path of the two tool paths, when the tool travels over a first tool path of the two tool paths it is subjected to relative displacement and/or rotation substantially in the direction of the axis of rotation of the tool such that when material is removed from the workpiece along the second tool path a milling area or a cutting line on the peripheral surface of the tool as compared to the removal of material from the workpiece along the first tool path is substantially displaced in the direction of the axis of rotation of the tool.

The above-mentioned apparatuses are suited to carry out one or more of the above mentioned processes comprising one or more of the above described preferred features. For this purpose, the apparatuses for generating control data preferably also comprise at least one point density limit value determination means for determining point density limit values for indicating limit values for the distances between two adjacent points of a line and/or of a column of points from the group of points on the at least one surface of the at least one flank section.

Furthermore, the present invention provides a computer program product which comprises a computer-readable medium and a computer program stored therein, the computer program being stored in the form of a state sequence which corresponds to commands that are adapted to be processed by a data processing means of a data processing equipment so that the data processing equipment in combination with the computer program product is suited to carry out a process according to at least one of the above described processes. Thus, a data processing equipment in combination with the computer program product provides in particular an inventive embodiment of an apparatus according to the present invention.

BRIEF DESCRIPTION OF THE DRAWINGS

FIG. 8 shows an embodiment of the apparatus for generating control data according to an embodiment of the present invention.

DETAILED DESCRIPTION OF THE FIGURES AND PREFERRED EMBODIMENTS OF THE INVENTION

The present invention is described and explained in detail below by means of embodiments of the process and the apparatus for generating control data according to the present invention by means of exemplary figures.

The following is a description of preferred embodiments of the process for generating control data for controlling a tool on a machine tool comprising at least 5 axes with reference to the production of a finished part having a base body 1 and a flank section 2 protruding from the base body 1 with simple geometry.

Figure 1:
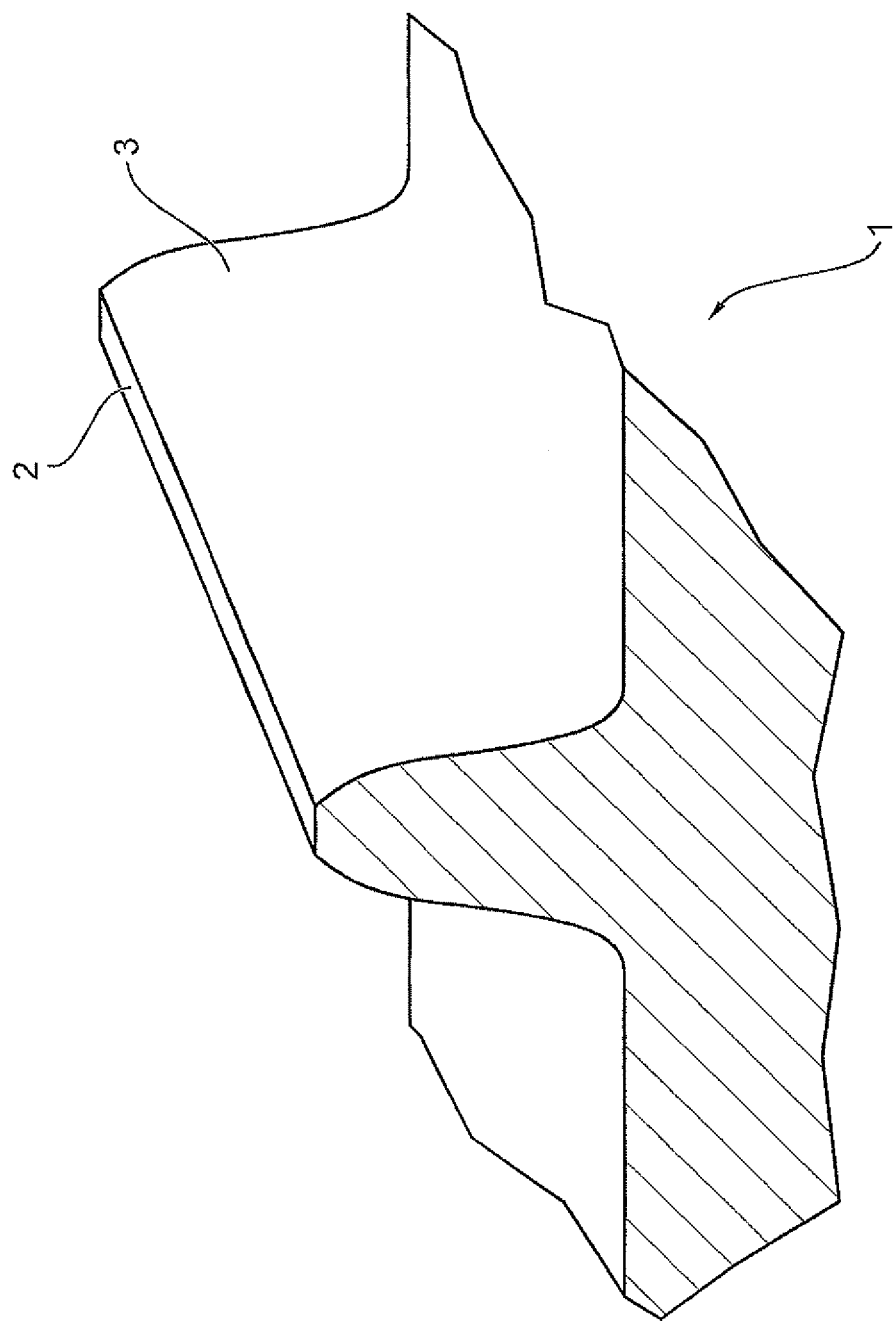
FIG. 1 shows an exemplary schematic diagram of an at least one flank section corresponding to an exemplary predetermined finished part geometry.

A section of an exemplary finished part having a base body 1 and a flank section 2 protruding from the base body 1 is shown in FIG. 1. The flank section 2 protruding from the base body 1 has a surface 3. By way of example, this surface 3 shown in FIG. 1 has a convex curvature as regards the height extension of the flank section, in other words in the direction in which the flank section 2 protrudes from the base body 1. However, the exemplary surface 3 has no curvature as regards the longitudinal extension of the flank section 2 in FIG. 1.

However, the present invention is not limited to such a geometry of a flank section 2 protruding from a base body. Any workpieces having a base body 1, in particular a rotationally symmetric base body 1, and flank section 2 of any geometries can rather be produced with the process according to the invention. In particular, the present invention enables the production of spur gears, bevel gears, blinks and impellers, each having complex predetermined geometries.

In these cases, each flank section 2 corresponds to a gearing of a gear wheel or a blade of an impeller or blisk. In particular, the process according to the invention enables the production of spur gears having internal or external gearing or bevel gears having any gearing shapes, in particular e.g. having straight gearing, helical gearing, double helical gearing or herringbone gearing, circular arc gearing, spiral gearing or involute gearing, the tooth flanks being able to comprise any curvatures having convex and/or concave shape, e.g. in the form of an involute.

In particular, it is possible to shape any surfaces with the process according to the invention, which may have any convex and/or concave curvatures on one side or on all sides, e.g. also any free-form surfaces having constant curvatures.

An embodiment of the process according to the invention for generating control data by means of a finished part is described by way of example whose predetermined finished part geometry comprises a base body 1 from which a flank section 2 protrudes as shown in FIG. 1. The inventive principle of the process for generating control data is here explained concretely by means of this example. The flank section 2 here corresponds by way of example to a flank shape as occurs in a gear wheel having straight teeth, for example. Correspondingly, the surface 3 shown in FIG. 1 of the flank section 2 is linear longitudinal direction of the flank section 2 and has no curvature in this direction. In the height direction of the flank section 2, the surface 3 is convexly curved as an example.

To simplify matters, the section shown of the base body 1 has a planar shape in the area in which the flank section 2 protrudes from the base body 1. However, the present invention is not limited to such shapes of a base body but the base body 1 can rather optionally correspond to rotationally symmetric basic shapes, a flank section 2 protruding from a curved outer surface of the base body 1. In the case of a spur gear, the base body 1 is e.g. formed by a cylindrical base body and in the case of a bevel gear, the base body 1 is e.g. formed by a conical base body or at least by a rotationally symmetric reference cone body.

When gear wheels, in particular spur gears or bevel gears, are produced, the workpiece is in practice provided with a plurality of flank sections, e.g. to form a plurality of tooth flanks. Here, the individual flank sections 2 have in each case substantially equal geometries or geometric shapes. However, the present invention is not limited to the production of gear wheels, in particular spur gears or bevel gears, but it is rather also possible to shape workpieces with base bodies and flank sections protruding therefrom, each having a different geometry or geometric shape, e.g. blades of an impeller or blisk.

In general, the present process is applicable to the production of workpieces having a base body 1 and a flank section 2 which protrudes from the base body 1 and this is why embodiments of the process according to the invention for generating control data by means of a finished part are described below as shown in FIG. 1, i.e. with only one flank section 2 having a surface 3.

The shape of the surface 3 is machined using a tool clamped in a machine tool comprising at least 5 axes along numerically generated tool paths to remove material from the workpiece until the finished part geometry of the finished part is been achieved. For this purpose, it is necessary to generate or calculate tool paths along which the tool can be guided to remove material from the workpiece so that the surface 3 is formed in accordance with a predetermined geometric shape of the surface 3.

According to the invention, fundamental geometry parameters of the finished part are first determined to be able to generate finished part geometry data indicating the geometric shape of the surface 3 of the flank section 2. Such fundamental parameters comprise e.g. height and longitudinal extension of the flank section 2, curvature shape of the surface 3 in the longitudinal and height extension of the flank section 2, a width of the flank section 2 and optionally a desired convexity of the surface 3. Fundamental geometry parameters can manually be inputted on a computer, for example, and/or be calculated by means of technical guidelines, e.g. computer-assisted using a CAD/CAM system.

Figure 2:
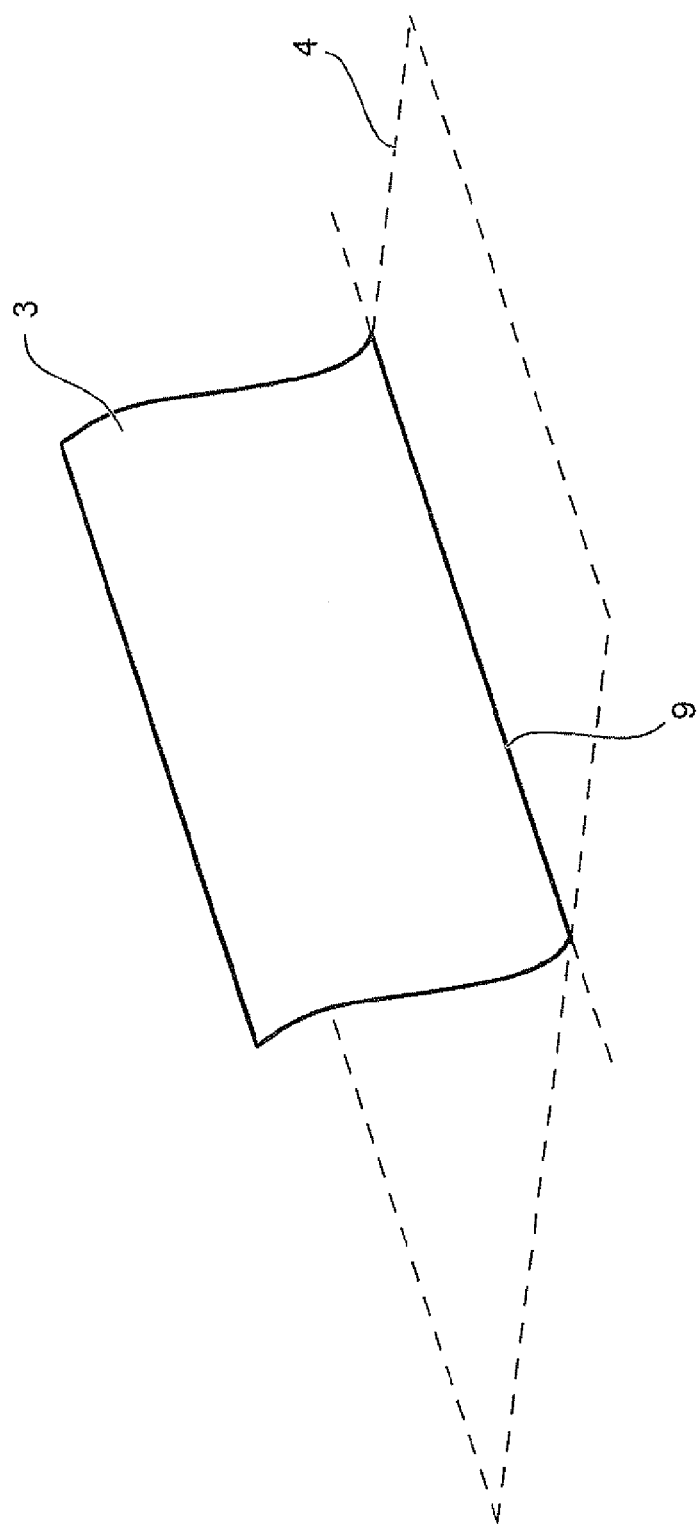
FIG. 2 shows an exemplary schematic diagram of a surface of the flank section shown in FIG. 1 and its orientation towards a surface of the base body of the finished part geometry.

FIG. 2 shows by way of example the desired geometric shape of the surface 3 of the flank section 2 shown in FIG. 1 and the relative orientation of the surface 3 with respect to the orientation of the geometric lateral surface 4 of the base body 1 shown in FIG. 1, which is shown in dashed line in FIG. 2.

Figure 3:
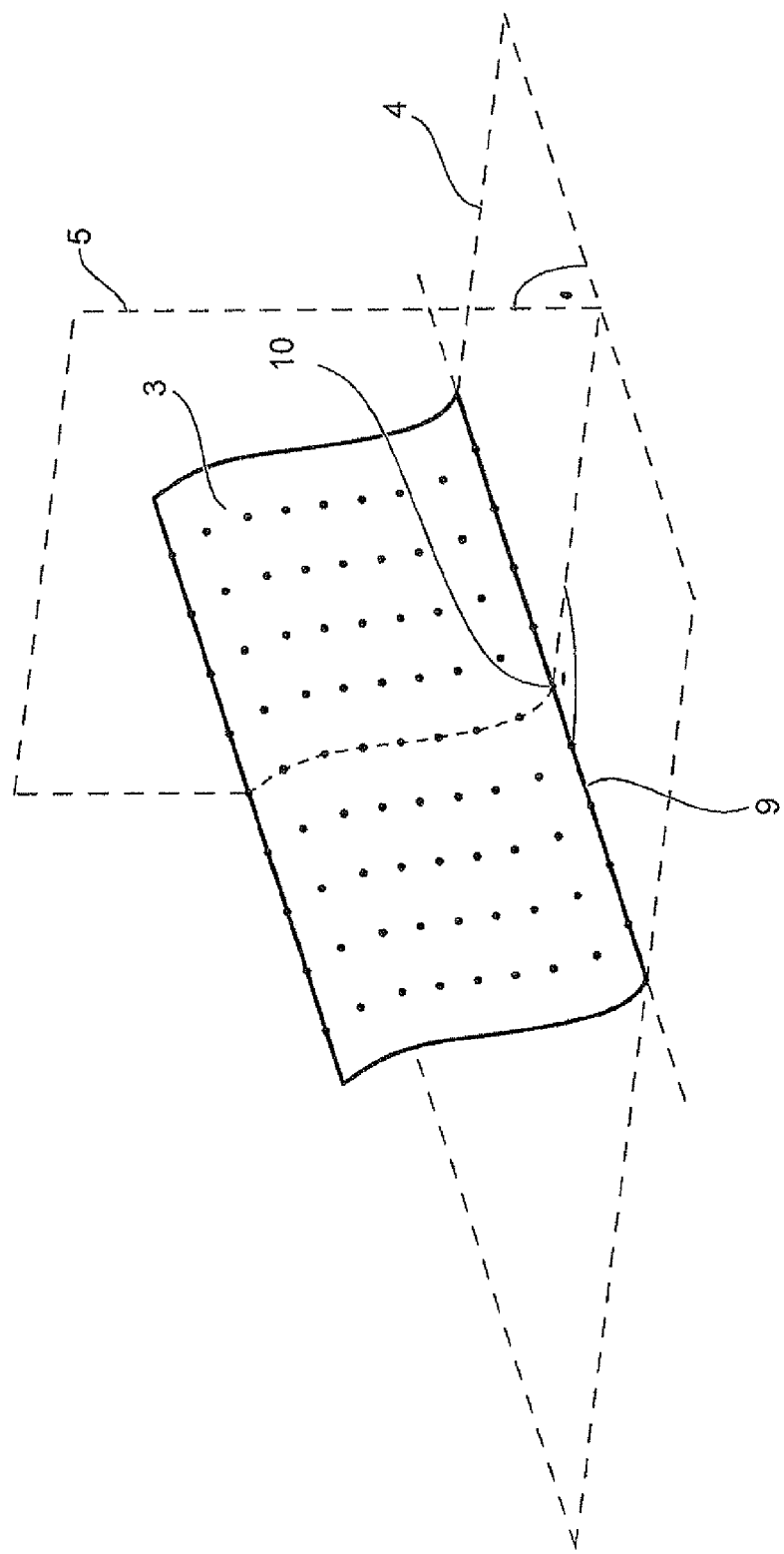
FIG. 3 shows an exemplary schematic diagram of the surface shown in FIG. 2 comprising an exemplary diagram of a group of points according to an embodiment of the process for generating control data according to the present invention.

FIG. 3 shows the schematic diagram of the geometric shape of the surface 3 from FIG. 2 together with a group of points on the surface 3, which permit according to the invention to accurately describe the geometric shape of the surface 3 in a mathematically accurate fashion. According to the invention, the group of points is arranged on the surface 3 of the flank section 2 such that each point of the group of points is attributed to a line of points and a column of points.

As shown in FIG. 3, the group of points is arranged on the surface 3 such that the points which are attributed to a column lie on a common plane 5 which, in turn, is perpendicular to the orientation of the lateral surface 4 of the base body 1. When gear wheels are produced, the geometric outer surface 4 of the base body 1 is usually curved on at least one side, other than shown in the figures, and in the case of a spur gear corresponds to a geometric lateral surface 4 of a cylinder or hollow cylinder and in the case of a bevel gear to a curved geometric lateral surface 4 of a cone or rotationally symmetric reference cone. In such a case, the points of the groups of points are arranged on the surface 3 of the flank section 2 such that a common plane 5 in which all points lie in a column, are perpendicular to a tangent plane of a geometric outer surface of the base body 1. For this purpose, this tangent plane is a tangential plane in a common point 10 of the lateral surface of the base body with a common plane 5. The orientation of the common plane can advantageously be to arranged perpendicularly to a lead cam 9, the lead cam 9 being a curve extending along the lateral surface of the base body. When a gear wheel is produced, the lead cam can here extend in a particularly advantageous way on the tooth base between two teeth of the gearing.

In the step of producing finished part geometry data, position data is generated, the position data indicating the accurate geometric position of all points on the surface 3, the position data with respect to each of the points of the group of points providing information on the position of the point in the three-dimensional space. Furthermore, in this embodiment of the process for generating control data according to the present invention normal data is also produced which with respect to each point of the group of points also has a normal vector of the surface 3 at the respective point along with the position data.

Figure 4:
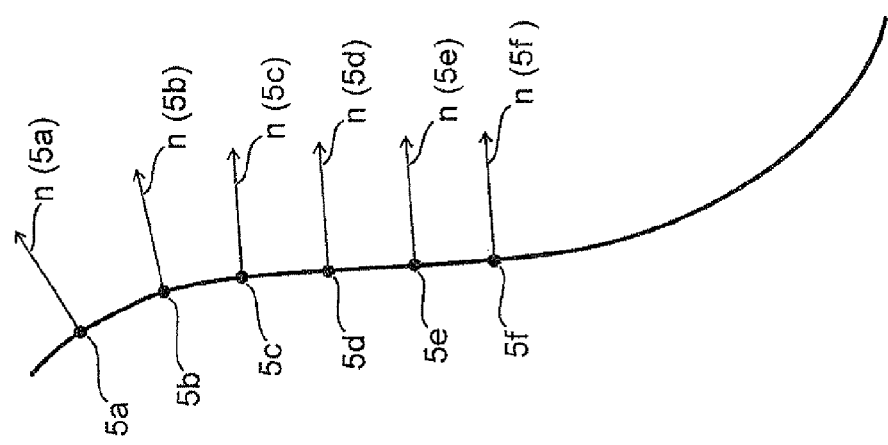
FIG. 4 shows an exemplary schematic diagram of a pattern in the common plane of a column of points of the group of points according to an embodiment of the process for generating control data according to the present invention.

This is shown in FIG. 4 which shows points 5a, 5b, 5c, 5d, 5e and 5f by way of example, all attributed to the same column of points and lying in a common plane 5 which corresponds to the plane of projection of FIG. 4. FIG. 4 also shows an intersection curve of the surface 3 with the common plane 5. The normal vectors n(5a) to n(5f) represent the respective normal vectors at points 5a to 5f which in points 5a to 5f are perpendicular to the surface 3 and thus describe an orientation of the surface 3 in points 5a to 5f. Thus, the finished part geometry data comprises both the position data which gives the position of the points and the normal data which gives the orientation of the surface 3 at these points.

This enables in a particularly simple and mathematically accurate way the provision of data by means of which the path data can advantageously be calculated to control the tool 6. This is shown for a point 5d in FIG. 5 by way of example. An intersection curve of the surface 3 with the common plane 5 of points 5a to 5f is shown, the plane of projection of FIG. 5 corresponding to the common plane 5. The tool 6 which rotates about the axis of rotation 7 of the tool 6 to remove material from the workpiece, can be determined in a mathematically accurate way by means of the finished part geometry data since the tool position can precisely orient itself by the position data which gives the position of point 5b, wherein in addition to the position of the tool it is possible to arrange the orientation of the tool which corresponds to the orientation of the axis of rotation 7 of tool 6 at point 5b by means of the normal data by controlling the tool 6 perpendicularly to the normal vector n(5b) so that the axis of rotation 7 is perpendicular to the normal vector in point 5b, i.e. parallel to the tangent plane of the surface 3 in point 5b. As according to the invention the orientation of the tool lies in the common plane 5 according to this embodiment of the present invention, the tool guide can be arranged in a mathematically accurate way by means of the position data of point 5*b* and the accompanying normal data.

In order to generate control data, path data is then calculated or generated, paths being accurately calculated that guide the tool 6 parallel to a curve which passes through all points of a line of the group of points on the surface 3. Since position data and normal data are generated with respect to all points of a line, the path calculation along a line of points can be generated in a mathematically accurate and simple way.

A plurality of machining paths are thus calculated or path data for a plurality of tool paths is generated, each of the tool paths being guided parallel to a line of points of the group of points on surface 3. Correspondingly, the number of the tool paths is equal to the number of lines of points. Thus, the group of points comprises columns of points each comprising the same number of points so that each point can be attributed to a line and none of the lines overlaps another line.

Before the finished part geometry data is generated, it is also possible to input point density limit values by which limit values for minimum and/or maximum distances between two adjacent points of a line and/or column can be determined, or also limit values for minimum and/or maximum values of an average distance between two adjacent points of a line and/or column of the group of points.

It can be necessary to input or predefine such point density limit values since in the case of more complex geometric shapes of surfaces 3 optionally having a convex or concave curvature in various directions lines of points and/or columns of points can vary in each case as regards distance and in general are not generated with equal or constant distances as in the case of the exemplary diagram in FIG. 3.

Thus, it can advantageously be guaranteed according to the invention that the tool guide is carried out by means of the generated path data such that the orientation of the tool always lies in a plane which is perpendicular to the base body 1. Thus, it is hence possible to prevent the tool 6 from unnecessarily adopting an inclined position relative to the base body and/or constantly or discontinuously changing into an inclined orientation relative to the path axis or path tangent when it travels over calculated tool paths unlike processes which orient themselves by calculated tool paths.

Thus, in contrast to prior art processes which orient themselves by isoparameter curves the process according to the invention offers the advantage that unnecessary and discontinuous rotational axis movements can be avoided or prevented when the tool 6 travels over the calculated tool paths so as to additionally achieve in advantageous manner an optimized surface finish. This enables an accurate shaping of the surface 3 with accurate positioning of the desired tooth contact pattern so that in particular in the production of gear wheels flank surfaces can be formed which enable optimized rolling characteristics during the rolling movement of a gear wheel on the flank of a mating gear wheel so as to also enable running noises occurring during the rolling movement of a gear wheel produced in this way on the mating gear wheel in a noise reduced or noise optimized way.

In a further embodiment of the process for generating control data according to the present invention, a plurality of machining paths are calculated, each of the machining paths being guided along a line of points of the group of points, each path being calculated such that along the path the tool is arranged in an always mathematically accurate way at the points on the surface 3 of the line with respect to which the path is calculated at the same time, at the position data of the points of the line and the normal data, as described above.

Figure 5:
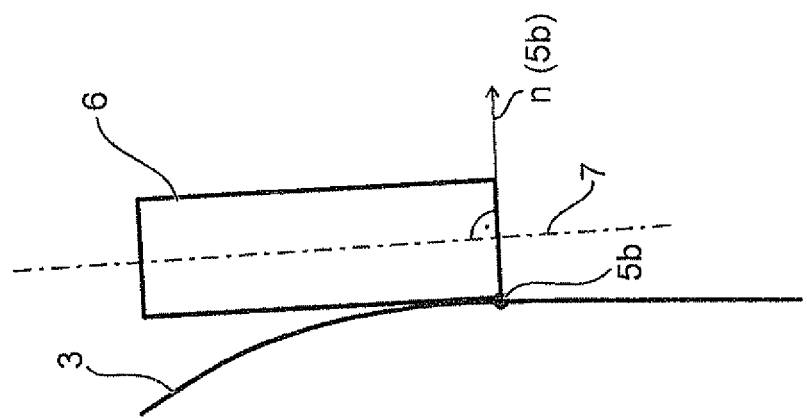
FIG. 5 shows an exemplary schematic diagram of a positioning of a tool at a surface in proportion to one of the points of the group of points with an orientation perpendicular to a normal vector at the point according to an embodiment of the process for generating control data according to the present invention.
Figure 6:
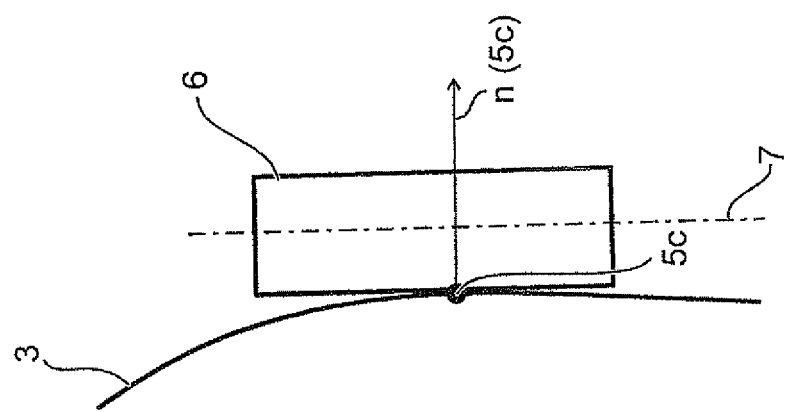
FIG. 6 shows an exemplary schematic diagram of a positioning of a tool at a surface of the flank section in a tool positioning varied as compared to the positioning shown in FIG. 5, which is displaced in parallel to the axis of rotation of the tool according to an embodiment of the process for generating control data according to the present invention.

However, in this embodiment a relative tool position towards or parallel to the axis of rotation 7 of tool 6 is displaced when a first tool path is calculated and a second tool path is calculated in comparison between the first and second tool paths. This is illustrated by FIGS. 5 and 6 which by way of example show a position of the tool 6 at points 5*b* in FIG. 5 and point 5*c* in FIG. 6. In FIG. 5, the position of the tool 6 is oriented such that the bottom side of the tool is placed at the same level as point 5*b*. Since the surface 3 has a curvature; in this example a convex curvature, the application area of tool 6 is limited to a lower area of tool 6 when it travels over the path along the line of points to which point 5*b* is attributed, and due to the curvature of the surface 3 the tool 6 is optionally not loaded, or at least loaded less, in the upper area than in the lower part of the tool 6.

FIG. 6 shows the tool positioning at a point 5*c*, a relative position of the tool 6 with respect to point 5*c* being displaced in parallel to the axis of rotation 7 of tool 6 so that an application area of the tool 6 is displaced parallel to the axis of rotation 7 of tool 6. In other words, a path calculation is carried out such that in a path guide along a first line of points compared to a path guide along a second line of points the tool is subjected to relative displacement towards the axis of rotation 7 of the tool so that an application area or a cutting line is displaced on the peripheral side of the tool 6. Thus, path data is generated such that when the tool travels over a first path optionally other areas of the tool 6 are loaded as is the case for the travel over a second path so that a wear of the tool 6 can be reduced since the signs of wear are distributed over a longitudinal extension of the tool 6.

In other words, the application area for each tool path is shifted and the wear of the blades of the tool 6 is distributed from a single position at a sensitive location, such as the tip of the tool, to a wider range along the blade.

The above described embodiment is applicable to substantially cylindrical tools. In the case of substantially conical tools, a displacement is not carried out in parallel towards the axis of rotation of the tool according to the invention, as described above, due to the tool shape to achieve a similar advantage but shifting is carried out substantially parallel to the surface to be machined depending on the positioning angle of the tool substantially towards the axis of rotation of the tool, optionally even in connection with a rotation of the axis of rotation.

All in all, the above described processes advantageously enable considerably longer tool lifetimes and a resulting reduction in the tool costs and a reduction in the down times, e.g. resulting from necessary tool changes by increased wear, Furthermore, this additionally enables an optimization of the surface finish since the surface finish is influenced by a wear state of the tool 6 so as to additionally avoid geometry errors caused by wear on the workpiece. Furthermore, this avoids problems on account of manual errors caused by human error, such as giving in exchange a wrong replacement tool or input errors when the tool parameters of the replacement tool given in exchange is defined.

Irrespective of the above described generation of the path data by means of the group of points, the invention also enables the achievement of the above described advantages by generally shifting a relative tool position between the travel over the first tool path and the travel over the second tool path towards the axis of rotation 7 of the tool 6 when control data is generated for a milling operation along at least two calculated tool paths, as shown in a comparison between FIGS. 5 and 6.

Figure 7A:
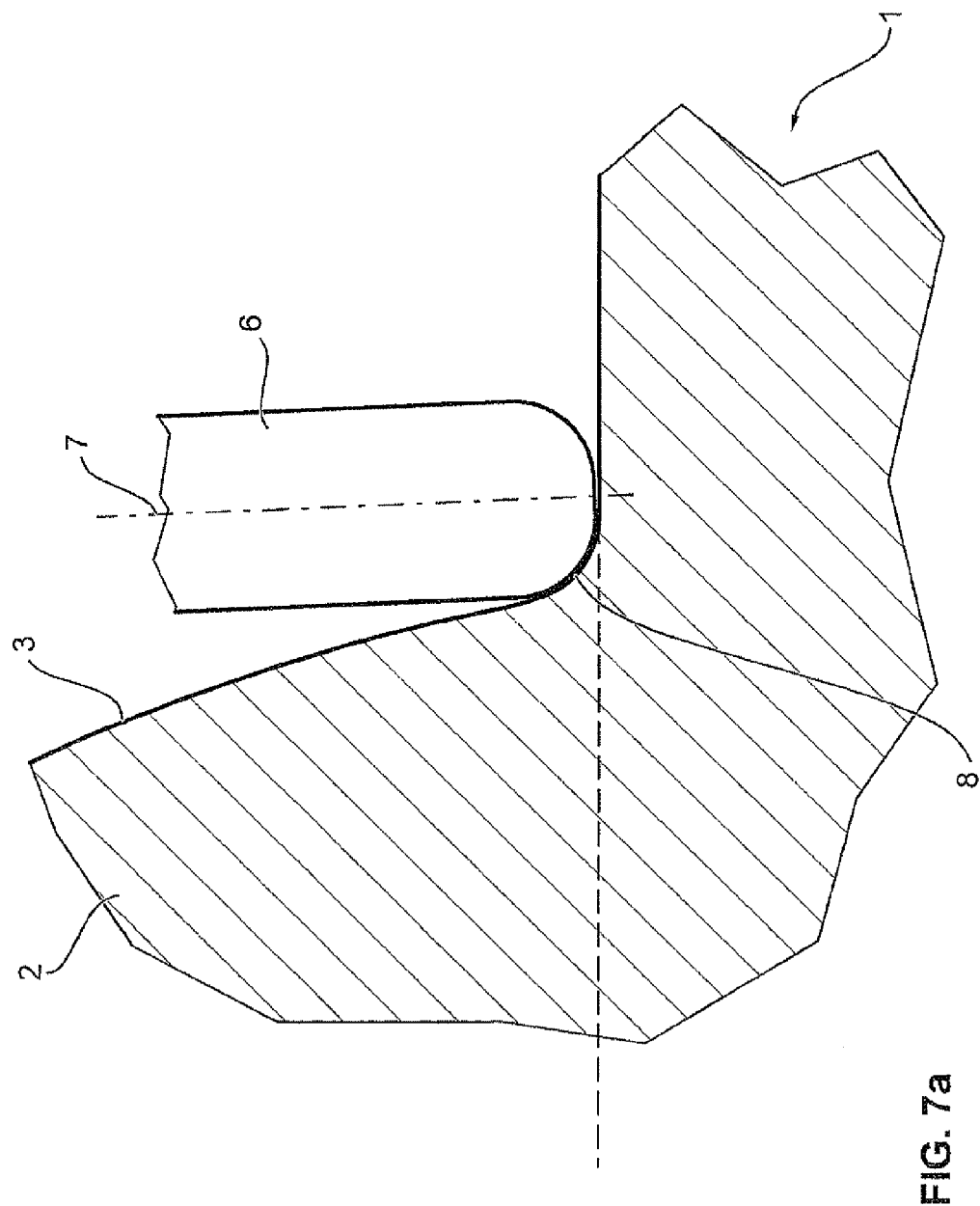
FIGS. 7A and 7B show an exemplary schematic diagrams of a positioning of an end milling cutter with corner radius for shaping a rounded transitional area between the at least one flank section and the base body according to preferred embodiments of the process for generating control data according to the present invention.

In a special embodiment of the process for generating control data, an end milling cutter having a rounded corner radius on the tip is also used by way of example, as shown in FIG. 7A. It enables the calculation of a path so as to calculate a last or deepest tool path parallel to the root course of the surface 3 of the flank section 2, a rounded transitional area 8 being simultaneously shapable between the flank section 2 and the base body 1 when the rounded corner radius of the end milling cutter 6 simultaneously travels over the path. The radius of the round transition area 8 can here be determined by a suitable selection of the end milling cutter 6 having a correspondingly chosen corner radius since the radius of the rounded transition area 8 substantially corresponds to the radius of the corner radius.

Figure 7B:
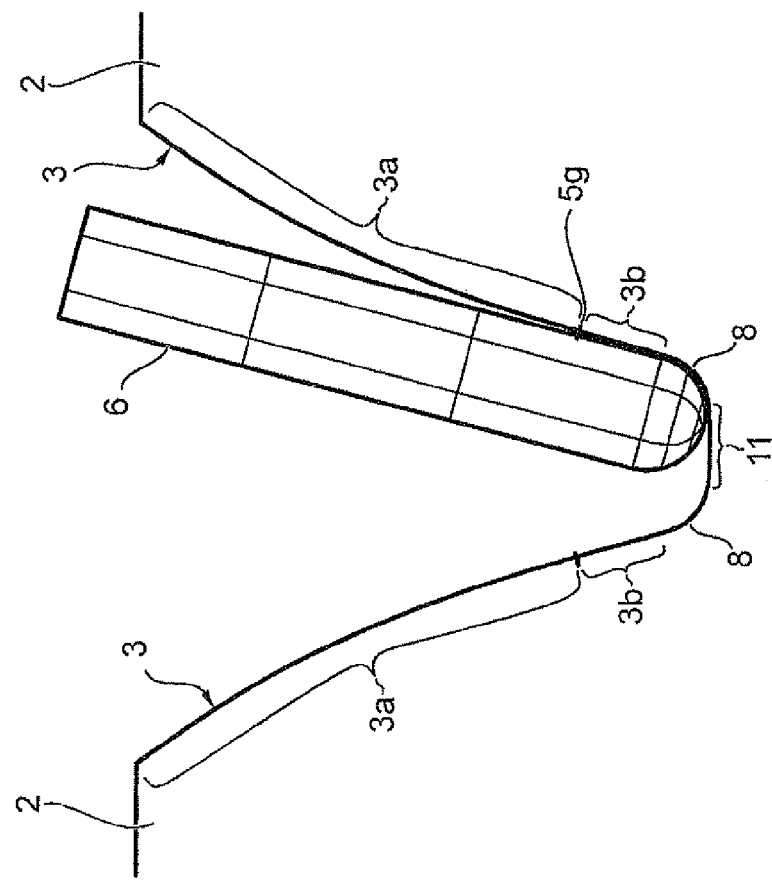

FIG. 7B shows a preferred embodiment of the process for generating control data where in addition a last or lowest tool path is calculated for an end milling cutter 6 by means of a rounded end milling cutter such that when the end milling cutter 6 travels over the path, oriented by the lead cam 9 at the transition between tooth base and tooth flank, it shapes or machines a rounded transition area 8 as well as a tangent section 3$b$ on the surface 3 of the flank section 2 between the base body 1 and the gearing-active tooth flank section 3$a$. The gearing-active tooth flank section 3$a$ here describes substantially the section of the surface 3 of the flank section 2 which contacts a corresponding mating flank in the case of a gearing and mating gearing or flank and mating flank rolling off each other and preferably has a curvature corresponding to the respective gearing shape. Preferably, a safety area can be additionally provided, which continues the curvature according to the gearing shape beyond the portion which contacts a corresponding mating flank in the case of a gearing and mating gearing or flank and mating flank rolling off each other.

In the cross-section shown in FIG. 7B, the tangent section 3$b$ substantially corresponds to a straight line and on the bottom side changes directly into the rounded transition area 8 and on the top side directly into the gearing-active tooth flank section 3$a$. Here, according to this preferred embodiment the end milling cutter 6 is positioned at the lowest point 5$g$ of the gearing-active tooth flank section 3$a$ in tangential fashion at the gearing-active tooth flank section 3$a$ to simultaneously shape or machine the tangent section 3$b$ as well as the round area 8 when travelling over the calculated, lowest line or path, oriented by the lead cam 9. The height of the tangent section 3$b$, i.e. the distance between the rounded transition area 8 and the gearing-active tooth flank section 3$a$, can be freely selected or adjusted as a presetting for the path calculation. In addition, FIG. 7B exemplarily shows that another tangent portion 11 is formed between two round transition areas on opposite sides of the tooth root, which tangent portion 11 substantially tangentially merges into the rounded transition areas 8 on both sides thereof. Such a tooth root profile provides an advantageously higher rigidity.

Thus, it is possible to machine a tooth flank which has another tangent section 3$b$ below the gearing-active tooth flank section 3 which can advantageously be shaped in a rapid and efficient fashion together with the rounded area 8 when the end milling cutter only travels over one tool path.

In summary, the shaping of in particular gear wheels on a 5-axis machine tool according to the above described processes enables a high flexibility, it also being possible to freely shape gaps between two tooth flanks in an area outside an area which is relevant with respect to milling and/or rolling (in which area there are contacts with a flank of the mating wheel during the rolling movement).

In order to carry out the above described processes for generating control data for controlling a tool on a machine tool comprising at least 5 axes, an apparatus 800 for generating control data is also provided, which is suited to carry out at least one of the above described embodiments of a process for generating control data. An embodiment of apparatus 800 is shown in FIG. 8.

The apparatus 800 here comprises a geometry parameter determination means 801 for determining fundamental geometry parameters of a finished part geometry of the finished part, the geometry parameter determination means 801 being suited to input fundamental geometry parameters of the finished part geometry of the finished part and/or to generate parameters by means of an input.

The apparatus 800 also comprises a finished part geometry data generation means 802 which is suited to generate finished part geometry data of the predetermined finished part geometry by means of the fundamental geometry parameters, the finished part geometry data generation means 802 being in particular suited to comprise finished part geometry data describing a surface 3 of the flank section 2 by a group of points, the finished part geometry data comprising position data and normal data, as described above.

Furthermore, the apparatus 800 comprises a path data generation means 803 for generating path data by means of the finished part geometry data according to at least one of the above described embodiments of the process for generating control data. In particular, the path data generation means 803 is suited to calculate one or more tool paths by means of the position data and normal data of the finished part geometry data, the positioning of the tool along a tool path orienting itself by the position data of the points and the tool orientation being arranged by means of the normal data at the points, a tool orientation being also arranged along a common plane of a column of points of the group of points, as described above.

In addition, the apparatus 800 comprises a point density limit value determination means 804 which is suited to determine point density limit values, e.g. by manual input, by means of which minimum and maximum distances from adjacent points of a line or a column of points can be determined and/or which is also suited to determine point density limit values, e.g. by manual input, which enables a minimum or maximum value for an average distance between two adjacent points of a line and/or column of the group of points.

Finally, the apparatus 800 comprises an interface 805 which enables the transmission of the calculated or generated path data as control data or as part of control data to a machine tool or a memory means so that the control data can be transmitted to a control device of the machine tool to control a tool used in the machine tool by means of the path data or control data to machine a workpiece clamped in the machine tool.

In summary, there is provided by the process according to the invention and the apparatus according to the invention for generating control data for controlling a tool on a machine tool comprising at least 5 axes for machining a workpiece for the production of a predetermined finished part having a base body 1 and a flank section protruding from the base body, which simulates by means of a special new calculation algorithm a milling operation, it being possible to calculate accurate point-vector sequences on the surface of the tooth flank at adjustable distances with which a path calculation for a tool on a machine tool is enabled in a mathematically accurate and simple way.

Both the tool position and the positioning or orientation of the tool along the surface, which may optionally correspond to any free-form surface, are not calculated by approach or approximation but in a mathematically accurate way based on the determined position of points and normal vectors. Thus, the surfaces, e.g. of tooth flanks, can thus be machined by the tool according to the invention in an efficient and flexible way using standard tools on a machine tool comprising 5 axes where in contrast to a conventional machining operation on conventional gear wheel milling machines any desired, optionally also multi-part tooth contact pattern can be produced in a particularly advantageous way.

In particular, the process according to the invention for generating control data for controlling a tool for machining a workpiece for the production of a predetermined finished part having a base body and a flank section protruding from the base body optimizes the prior art processes for generating control data on known CAD/CAM systems where a tool orientation is arranged by means of vertical isoparametric curves on the surface. Unnecessary variations of an inclination of the tool as compared to the lateral surface of the base body can be avoided so that in contrast to the prior art the process according to the invention can avoid unnecessary, irregular positioning of the tool, which is also unfavourable with respect to machining, relative to the surface to be machined with the consequence of an insufficient surface finish, geometric errors and increased wear of the tool. At the same time, pivoting movements can be avoided, which lead to unsteady rotational axis movements of the milling machine and resulting unsteady movements of the tool along the path.

The above described process and the corresponding apparatus for generating control data correspondingly represent an optimized process and an optimized apparatus compared to the processes and apparatuses known from the prior art.

The invention claimed is:

1. A process for generating control data for controlling a tool on a machine tool comprising at least 5 axes for machining a workpiece for the production of a predetermined finished part having a base body and at least one flank section protruding from the base body, wherein the process comprises the steps of:
    determining fundamental geometry parameters of a finished part geometry of the finished part, the finished part geometry corresponding to a geometry of the predetermined finished part;
    generating finished part geometry data of the predetermined finished part geometry of the finished part by means of the fundamental geometry parameters, the finished part geometry data indicating a geometric shape of a surface of the flank section; and
    generating path data by means of the finished part geometry data, the path data indicating the tool path along the surface of the flank section over which the tool has to travel with what tool orientation relative to the workpiece to remove material from the workpiece, the tool orientation of the tool corresponding to an orientation of an axis of rotation of the tool and the tool rotating about the axis of rotation of the tool to remove material from the workpiece, wherein
    the finished part geometry data for indicating the geometric shape of the surface of the flank section comprises position data of a group of points on the surface of the flank section, the position data indicating a position of the points of the group of points,
    each point of the group of points is attributed to a column of points and a line of points, all points of a column of points lying in a common plane and the common plane of the points of a column of points being perpendicular to a tangent plane of a lateral surface of the base body, the tangent plane of the base body being a tangential plane relative to the lateral surface of the base body in a common point of the common plane with the lateral surface of the base body,
    the path data is generated such that the tool path is parallel to a curve extending through the points of a first line of points,
    the path data is furthermore generated such that at each of the points of the first line of points the axis of rotation of the tool orients itself by the common plane of the column of the respective point of the first line, and
    the finished part geometry data for indicating the geometry of the surface of the flank section furthermore comprises normal data with respect to a first point of the group of points, the normal data indicating a direction of a normal vector of the surface of the flank section at the first point, the path data being furthermore generated such that at the first point the axis of rotation of the tool is perpendicular to the normal vector at the first point.

2. The process according to claim 1, wherein at each of the points of the first line of points the axis of rotation of the tool lies in a common plane of the column of the respective point of the first line.

3. The process according to claim 1, wherein the common point lies on a lead cam, the lead cam extending on the lateral surface of the base body.

4. The process according to claim 3, wherein the common plane is furthermore perpendicular to the lead cam.

5. The process according to claim 1, wherein the predetermined finished part is a gear wheel, an impeller or a blisk, the at least one flank section being a tooth flank of the gear wheel or a blade flank of the impeller or the blisk or that the predetermined finished part comprises any base body having at least one flank section protruding inwards or outwards.

6. The process according to claim 1, wherein the machine tool is a milling machine, milling machine/lathe or lath/milling machine and the tool, being a rotationally symmetric tool, is an end milling cutter, cherry, torus cutter, drum cutter or another rotationally symmetric tool.

7. The process according to claim 1, wherein the surface of the flank section is a surface in each case curved convexly and/or concavely in one or more directions or any curved free-form surface.

8. The process according to claim 1, wherein the path data indicates a plurality of tool paths along the surface of the flank section, the same number of points being attributed to each of the column of the group of points and each of the plurality of tool paths extending in each case parallel to one of the lines of points.

9. The process according to claim 1, comprising the further step of determining one or more point density limit values for the group of points on the surface of the flank section, in the step of determining finished part geometry data the finished part geometry data being generated such that in each case the minimum and/or average distance between adjacent points of a line of the group of points and/or adjacent points of a column of the group of points does not fall below one of the determined one or more point density limit values and/or in each case the maximum and/or average distance between adjacent points of a line of the group of points and/or adjacent points of a column of the group of points does not exceed one of the determined one or more point density limit values.

10. The process according to claim 1, wherein the tool is a tool comprising a corner radius, in particular an end milling cutter having a corner radius, the path data being generated such that a rounded transition area, arranged along the lead cam, between the flank section and the base body of the workpiece is formed during the travel over the tool path on the basis of the path data in accordance with the corner radius, the path data being in particular generated such that a tangential section is formed between the rounded transition area and a gearing-active flank area of the surface of the tooth flank section in addition to the rounded transition area when travelling over the tool path by means of the path data.

11. The process according to claim 1, wherein the tool has a longitudinal extension along the axis of rotation of the tool, the path data being furthermore generated such that compared to the travelling over a second tool path of a plurality of tool paths along a second line of points, when the tool travels over a first tool path of the plurality of tool paths, oriented by a first line of points, the tool is displaced and/or rotated relative to the particular line of points, oriented by the surface in the direction of the axis of rotation of the tool, such that when material is removed from the workpiece along the second tool path, a milling area, a cutting line or a cutting curve on the peripheral surface of the tool is displaced, as compared to the removal of material from the workpiece along the first tool axis, in the direction of the axis of rotation of the tool.

12. A process for generating control data for controlling a tool on a machine tool comprising at least 5 axes for machining a workpiece for the production of a predetermined finished part from the workpiece, the process comprising the steps of:
generating finished part geometry data of the predetermined finished part geometry of the finished part, the finished part geometry data indicating a geometry of the finished part; and
generating path data by means of the finished part geometry data, the path data indicating at least two tool paths over which the tool has to travel in each case with what tool orientation relative to the workpiece to remove material from the workpiece, the tool orientation of the tool corresponding to an orientation of an axis of rotation of the tool and the tool rotating about the axis of rotation of the tool to remove material from the workpiece and having a longitudinal extension along the axis of rotation of the tool, wherein
the path data is furthermore generated such that compared to the travelling over a second tool path of the at least two tool paths, when the tool travels over the first tool path of the at least two tool paths it is displaced in the direction of the axis of rotation of the tool such that when material is removed from the workpiece along the second tool path, a milling area or a cutting line on the peripheral surface of the tool is displaced compared to the removal of material from the workpiece along the first tool path towards the axis of rotation of the tool,
the finished part geometry data for indicating the geometry of the finished part comprises position data of a group of points on a surface of the finished part, the position data indicating a position of the points of the group of points,
each point of the group of points is attributed to a column of points and a line of points, all points of a column of points lying in a common plane and the common plane of the points of a column of points being perpendicular to a tangent plane of a lateral surface of the finished part, the tangent plane of the finished part being a tangential plane relative to the lateral surface of the finished part in a common point of the common plane with the lateral surface of the finished part,
the path data is generated such that the tool path is parallel to a curve extending through the points of a first line of points, and
the finished part geometry data furthermore comprises normal data, the normal data indicating a direction of a normal vector of the surface of the finished part at a point of at least one of the at least two tool paths, the path data being furthermore generated such that, at the point of the at least one of the at least two tool paths, the axis of rotation of the tool is perpendicular to the normal vector at the point of the at least one of the at least two tool paths.

13. The process according to claim 12, wherein the machine tool is a milling machine and the tool, being a rotationally symmetric tool, is a milling cutter, in particular a cylindrical, torus-shaped or conical milling cutter.

14. An apparatus for generating control data for controlling a tool on a machine tool comprising at least 5 axes for machining a workpiece for the production of a predetermined finished part having a base body and at least one flank section protruding from the base body, the apparatus comprising:
a geometry parameter determination means for determining fundamental geometry parameters of a finished part geometry of the finished part, the finished part geometry corresponding to a geometry of the predetermined finished part;
a finished part geometry data generation means for generating finished part geometry data of the predetermined finished part geometry of the finished part by means of the fundamental geometry parameters, the finished part geometry data indicating a geometric shape of a surface of the flank section; and
a path data generation means for generating path data by means of the finished part geometry data, the path data indicating the tool path along the surface of the flank section over which the tool has to travel with what tool orientation relative to the workpiece to remove material from the workpiece, the tool rotating about an axis of rotation of the tool to remove material from the workpiece, wherein
the finished part geometry data for indicating the geometry of the surface of the flank section comprises position data of a group of points on the surface of the flank section, the position data indicating a position of the points of the group of points,
each point of the group of points is attributed to a column of points and a line of points, all points of a column of points lying in a common plane and the common plane of the points of a column of points being perpendicular to a tangent plane of the lateral surface of the base body, the tangent plane of the lateral surface of the base body being a tangential plane relative to the lateral surface of the base body in a common point of the common plane with the lateral surface of the base body,
the path data is generated such that the tool path extends parallel to a curve extending through the points of a first line of points,
the path data is furthermore generated such that the axis of rotation of the tool at each of the points of the first line of points orients itself by the common plane of the column of the respective point of the first line, and
the finished part geometry data for indicating the geometry of the surface of the flank section furthermore comprises normal data with respect to a first point of the group of points, the normal data indicating a direction of a normal vector of the surface of the flank section at the first point, the path data being furthermore generated such that at the first point the axis of rotation of the tool is perpendicular to the normal vector at the first point.

15. The apparatus according to claim 14, wherein the axis of rotation of the tool at each of the points of the first line of points lies in the common plane of the column of the respective point of the first line.

16. The apparatus according to claim 14, wherein the common point lies on a lead cam, the lead cam extending along the lateral surface of the base body.

17. The apparatus according to claim 14, wherein the common plane is perpendicular to the lead cam.

18. An apparatus for generating control data for controlling a tool on a machine tool comprising at least 5 axes for machining a workpiece for the production of a predetermined finished part from the workpiece, the apparatus comprising:
- a finished part geometry data generation means for generating finished part geometry data of the predetermined finished part geometry of the finished part, the finished part geometry data indicating a geometry of the finished part; and
- a path data generation means for generating path data by means of the finished part geometry data, the path data indicating at least two tool paths along the at least one surface of the finished part over which the tool has to travel in each case with what tool orientation relative to the workpiece to remove material from the workpiece, the tool rotating about an axis of rotation of the tool to remove material from the workpiece and having a longitudinal extension along the axis of rotation of the tool, wherein
- the finished part geometry data for indicating the geometry of the finished part comprises position data of a group of points on the surface of the finished part, the position data indicating a position of the points of the group of points,
- each point of the group of points is attributed to a column of points and a line of points, all points of a column of points lying in a common plane and the common plane of the points of a column of points being perpendicular to a tangent plane of a lateral surface of the finished part, the tangent plane of the finished part being a tangential plane relative to the lateral surface of the finished part in a common point of the common plane with the lateral surface of the finished part,
- the path data is generated such that at least one of the at least two tool paths is parallel to a curve extending through the points of a first line of points,
- the path data is furthermore generated such that compared to the travelling of a second tool path of the at least two tool paths when the tool travels over a first tool path of the at least two tool paths it is displaced in the direction of the axis of rotation of the tool such that when material is removed from the workpiece along the second tool path, a milling area, a cutting line or a cutting curve along the peripheral surface of the tool is displaced in the direction of the axis of rotation of the tool compared to the removal of material from the workpiece along the first tool path, and
- the finished part geometry data furthermore comprises normal data, the normal data indicating a direction of a normal vector of a surface of the finished part at a point of at least one of the at least two tool paths, the path data being furthermore generated such that, at the point of the at least one of the at least two tool paths, the axis of rotation of the tool is perpendicular to the normal vector at the point of the at least one of the at least two tool paths.

19. A computer program product, which comprises a non-transitory machine-readable storage medium and a computer program stored therein, the computer program being stored in the form of a state sequence which corresponds to commands adapted to be processed by a data processing means of a data processing equipment so that in connection with the computer program product the data processing equipment is suited to carry out a process according to claim 1.

* * * * *